Figure 1:
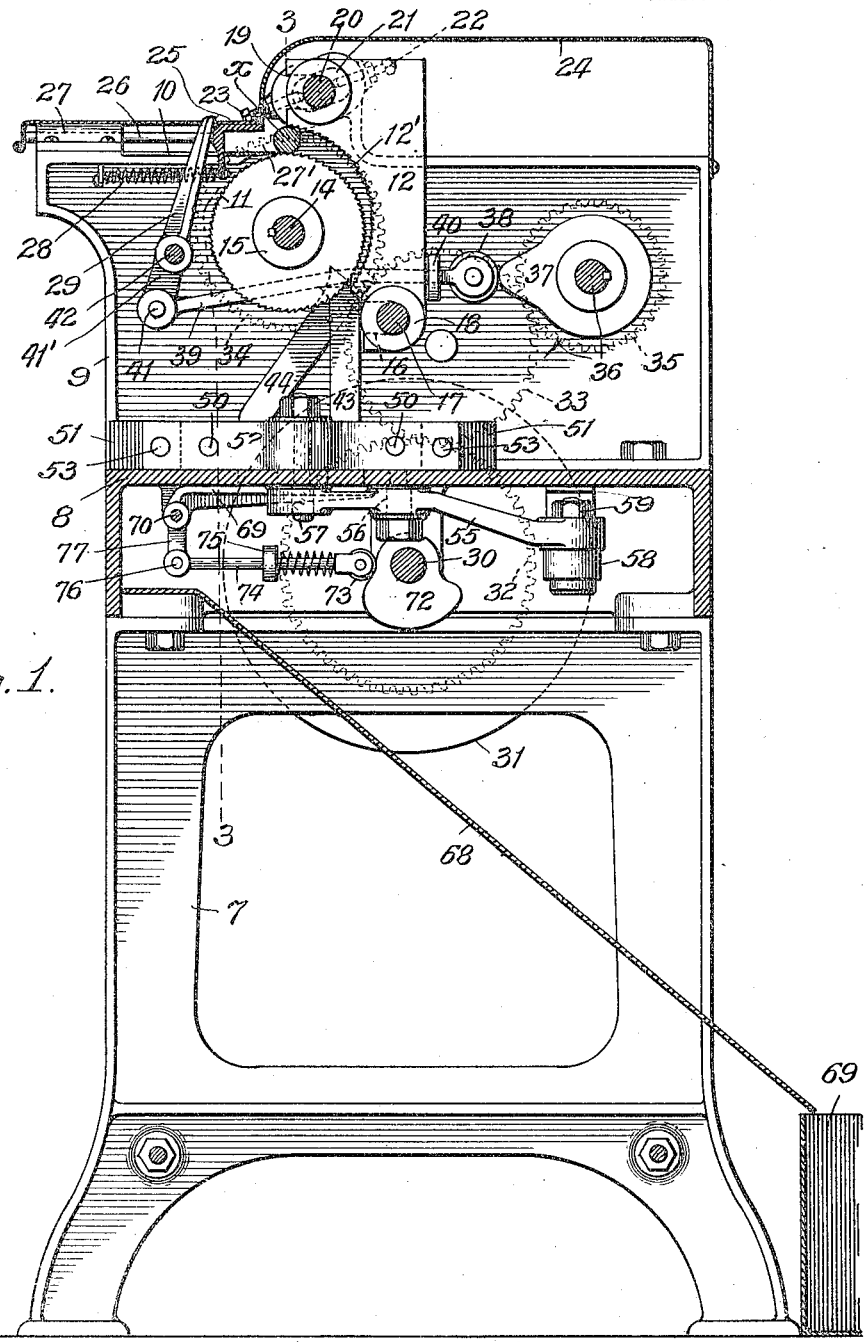

F. E. ZAISS.
MACHINE FOR FORMING CANDY.
APPLICATION FILED AUG. 7, 1916.

1,320,435.

Patented Nov. 4, 1919.
4 SHEETS—SHEET 1.

Witness:
John Enders

Inventor:
Fred E. Zaiss
by Fred Gerlach
his Atty.

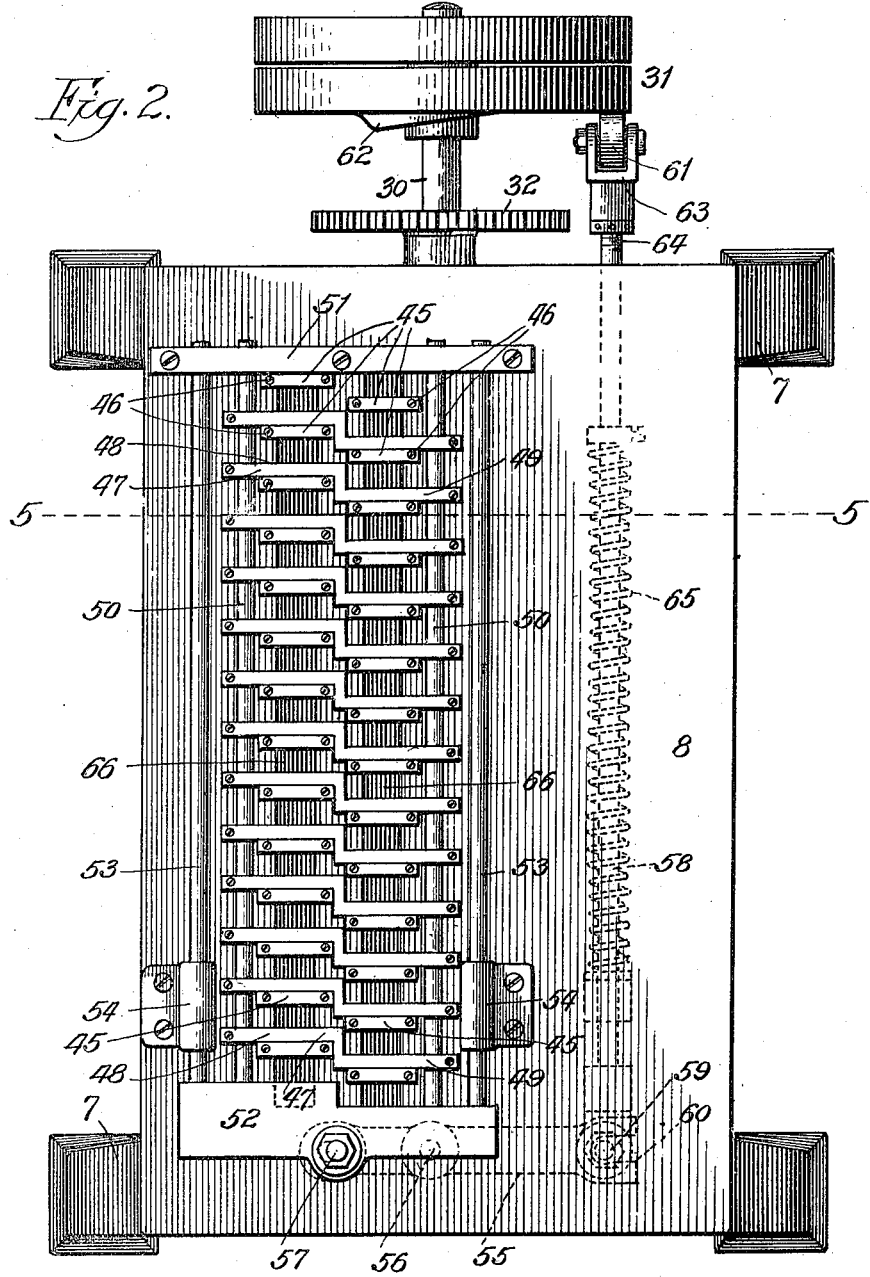

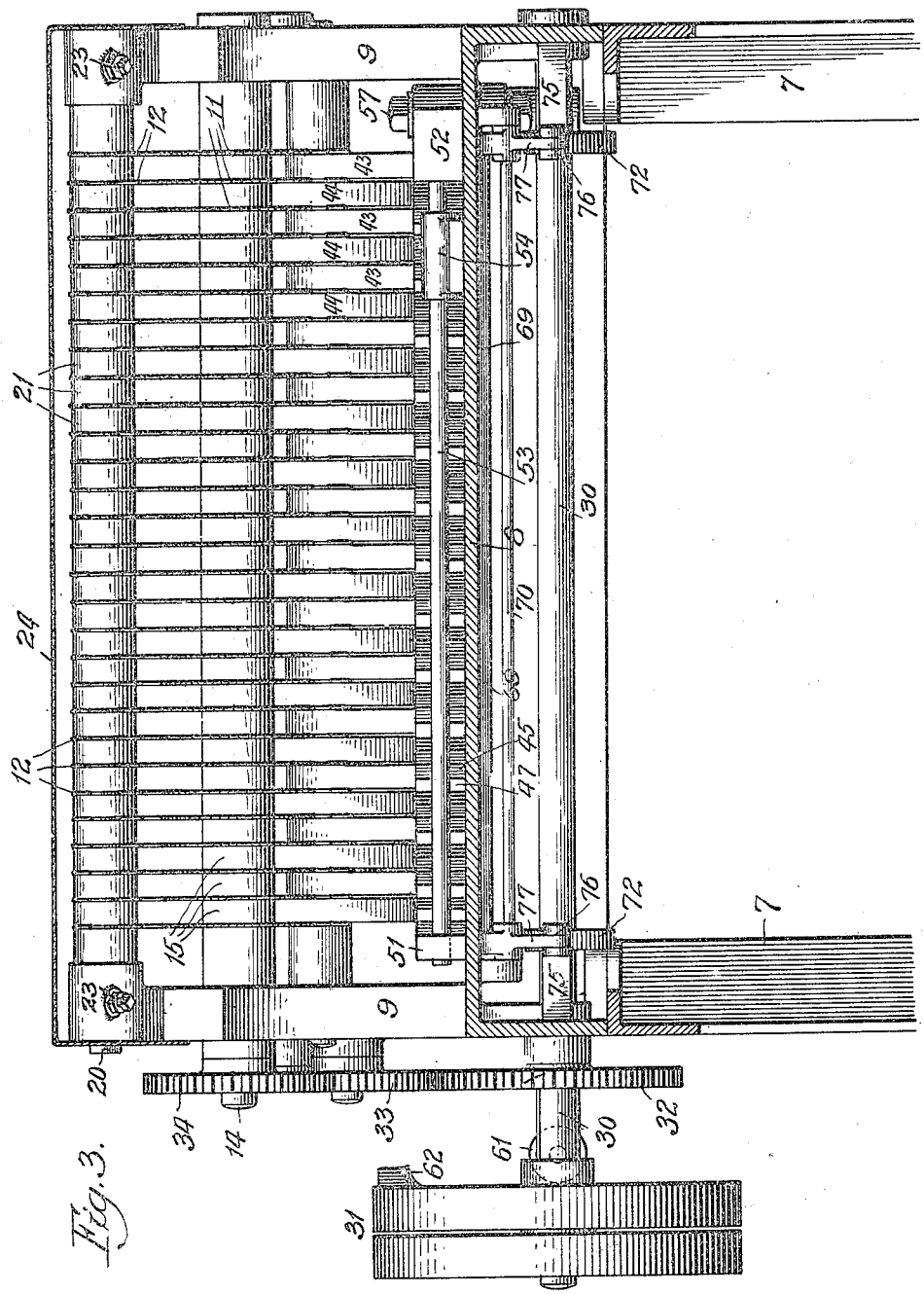

F. E. ZAISS.
MACHINE FOR FORMING CANDY.
APPLICATION FILED AUG. 7, 1916.
1,320,435.
Patented Nov. 4, 1919.
4 SHEETS—SHEET 4.
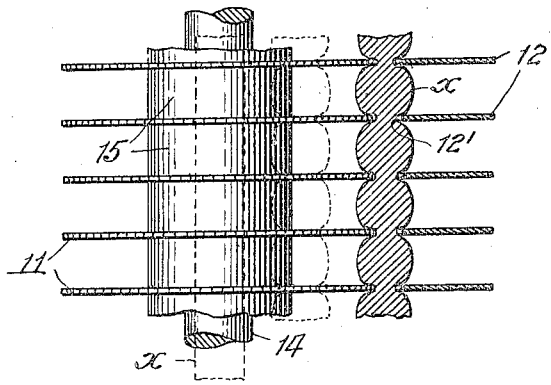
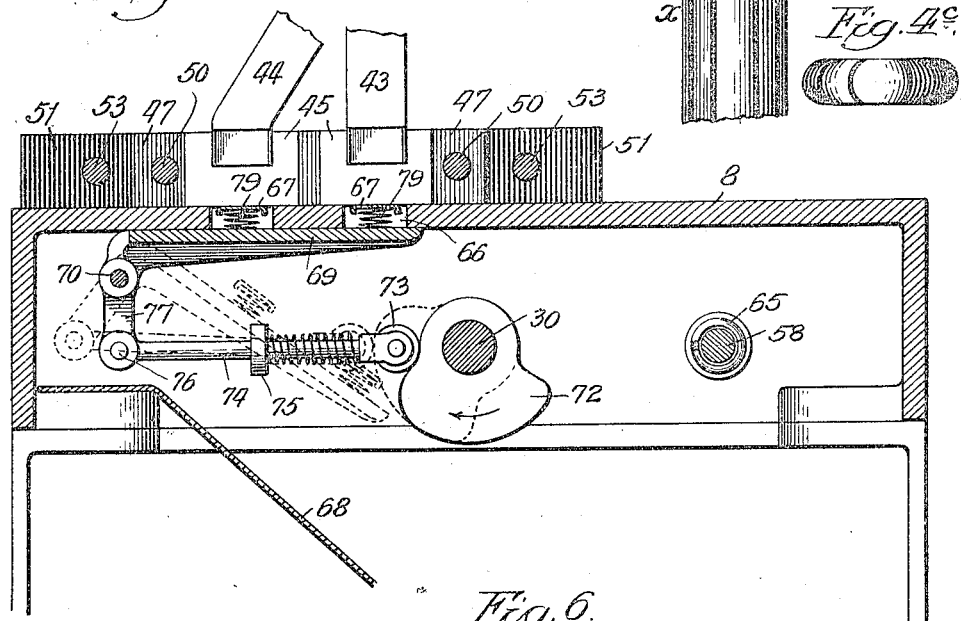
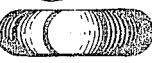
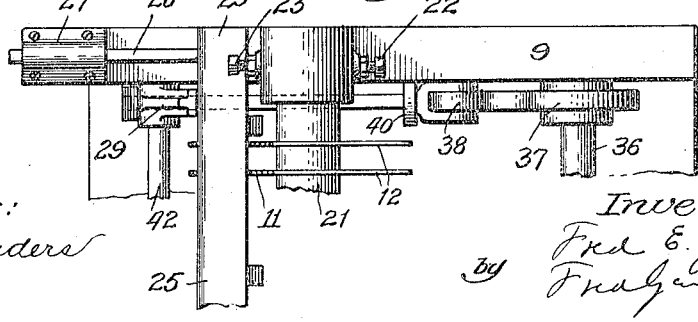

UNITED STATES PATENT OFFICE.

FRED E. ZAISS, OF CHICAGO, ILLINOIS.

MACHINE FOR FORMING CANDY.

1,320,435.     Specification of Letters Patent.     Patented Nov. 4, 1919.

Application filed August 7, 1916. Serial No. 113,475.

*To all whom it may concern:*

Be it known that I, FRED E. ZAISS, a citizen of the United States, and a resident of Chicago, in the county of Cook and State of Illinois, have invented certain new and useful Improvements in Machines for Forming Candy, of which the following is a full, clear, and exact description.

The invention relates to machines for forming candy, and more particularly to a hard candy product generally known as "kisses," which are formed by cutting a long stick which is usually striped or otherwise ornamented, into a series of small pieces which are then pressed into desired form.

Heretofore, it has been common practice to sever a long stick of candy between long blades or cutters operated by hand to roll the stick and gradually reduce the stick at the points desired, so that the stripes will be caused to extend to the centers of the kiss and as close as possible thereto so that the ends will be striped similarly to the periphery of the stick.

One object of the invention is to provide an improved machine which is provided with power-operated cutters and whereby a stick of candy will be severed into pieces of the desired size and then delivered to presser-devices by which the pieces will be individually pressed into the desired form. Such a machine is automatic after the sticks are fed to it, and as a result, it has a high capacity and reduces the cost of production.

A further object of the invention is to provide improved mechanism for severing a long stick or strip of candy into a series of small pieces.

A further object of the invention is to provide improved pressing or forming mechanism for pieces of candy cut from a long stick.

The invention consists in the several novel features hereinafter set forth and more particularly defined by claims at the conclusion hereof.

In the drawings: Figure 1 is a vertical section of a machine embodying the invention. Fig. 2 is a plan of the forming mechanism, the parts thereabove being omitted. Fig. 3 is a section taken on line 3—3 of Fig. 1. Fig. 4 is a detail of the cutting mechanism. Fig. 4ª is a detail of a stick of candy upon which the machine is adapted to act. Fig. 4ᵇ is a detail of one of the pieces in the form in which it is severed from the long stick. Fig. 4ᶜ is a detail of one of these pieces after it has been acted upon by a presser device. Fig. 5 is a section taken on line 5—5 of Fig. 2. Fig. 6 is a plan of a portion of the machine, the cover being omitted.

The several mechanisms of the machine are mounted in or on a supporting frame comprising lower frame sides 7, a table or horizontal bracket 8 mounted thereon, and upper frame-sides 9 bolted to said table. The machine comprises generally, gangs of cutting devices for severing a long stick into small pieces, and presser-devices to which the pieces are delivered and in which they are pressed into the desired form. The sticks of candy are slightly plastic when fed into the machine, but become hard after they have been formed.

Mechanism is provided for feeding the sticks to the cutter mechanism and a plate 10 fixedly mounted upon the upper frame-sides 9 is adapted to receive a stick of candy $x$. This plate is adapted to hold the stick $x$ for delivery to a gang of cutting devices whereby the entire stick will be simultaneously cut into short pieces. This cutting mechanism consists of rotary, circular saw-toothed cutters 11 which are arranged in co-acting relation with a corresponding gang of stationary saw-toothed cutters 12. Each cutter 12 is provided with a toothed cutting edge 12', the upper portion of which is spaced from the edge of its coöperating cutters 11, a distance corresponding substantially to or slightly less than the thickness of the stick of candy $x$, and from this point, the edge 12' extends in a curved direction to its lower end where it approaches the edge of the rotary cutter so closely that the stick in its passage between the cutters will be severed. The stick, during the cutting operation is advanced by the rotary cutters co-acting with the stationary cutters, so that the stick will be rolled or rotated on its axis in transit through the cutting mechanism. This action causes the cutters to form grooves in the stick of gradually increasing depth until the pieces of the stick have been completely severed from one another. This action is important in forming candy "kisses", because in many cases, the stick is striped or otherwise ornamented and by gradually rolling grooves in the sticks, the stripes or designs are drawn toward the axis of the stick on points where the pieces are severed from one another so that the stripes or design will extend over the ends of the pieces, as shown in Fig. 4b. All the cutters 11 are mounted on a shaft 14 which is journaled in the side-frames 9 and the cutters are held in spaced relation corresponding to the length of the pieces into which the candy stick is to be cut, by spacing-washers 15. The stationary cutters 12 are formed with slots 16 through which a rod 17 is extended to properly support their lower portions, and spacing rings 18 are interposed between the blades 12. The upper ends of the cutters 12 are slotted, as at 19, and are secured on a rod 20 which is adjustably mounted in the frame-sides 9. Rings 21 between the fixed cutters hold the upper portions in properly spaced relation. Rod 20 is adjustably held between set screws 22 and 23 by which the rod and the upper ends of the cutters are secured thereon may be secured and adjusted to bring the upper portions of the cutting edges 12' closer or farther from the rotary cutters to adapt the machine for candy sticks of different thicknesses. A hood 24 is extended over the upper portions of the cutters 12.

A pusher-bar 25, which is provided with rods 26 which are slidably held in the guides 27, provided with fingers 27' are adapted to feed the stick placed on the table 10 into the bite of the cutting mechanism. Arms 29, fixed to and cross-connected by a shaft 42, are provided to operate the pusher to feed the stick and springs 28 are applied to retract the pusher 25.

Continuous rotation is imparted to the gang of circular cutters 11 from a power shaft 30 which is journaled in table 8. Shaft 30 may be driven in any suitable manner as by a belt-pulley 31 from any suitable source of power. The mechanism for driving the cutters 11 from shaft 30 comprises a gear wheel 32 fixed on shaft 30, an idler gear 33 meshing with gear 32 and a gear 34 fixed to one end of the shaft 14 of the rotary cutters 11. Intermittent movement is imparted to arms 29 to operate pusher 25 to feed the stick of candy into the cutting mechanism by a gear 35 which meshes with the idler 33 and is fixed to a shaft 36; a cam 37 fixed to said shaft is adapted to operate a roller 38 carried by a link 39 which is held in a guide 40 and is pivoted, as at 41, to an arm 41' on one of the arms 29. One arm 29 is provided at each side of the machine and both are fixed to rock shaft 42.

From the lower end of the cutting devices, the pieces of candy are delivered into chutes which deliver them to the forming mechanism, which comprises two rows of presser devices relatively offset. Chutes 43 deliver pieces of candy into one row of said devices and the alternate chutes 44 conduct pieces of candy to the other row. The purpose of providing offset rows of presser devices is to provide room for the placement and operation of the movable side-members of these devices, because the spaces between the pieces of candy as they leave the cutting mechanism is insufficient for this purpose.

Each presser device comprises a stationary side-wall or member 45 which is fixedly held by screws 46 on the top of the table 8 and a movable side-member formed by a plate 47 which comprises a presser portion 48 to co-act with the stationary member 45 of one row of presser devices and a relatively offset portion 49 which coacts with one of the stationary members 45 of the other row of presser devices. All of the bars 47 are fixed to a pair of rods 50. One end of rod 50 is longitudinally slidable in a guide 51 fixed to the top of table 8 and the other end of said rod is secured to a head 52. Said head is fixed to a pair of rods 53 which are slidably held in guide brackets 54 and in guide 51.

The mechanism for operating the movable side-members 47 of presser-devices comprises a lever 55 which is pivoted to the underside of table 8, as at 56, and is pivotally connected to head 52, as at 57, and a rod 58 which is mounted to slide longitudinally in lugs on table 8 and is pivoted by means of a bolt 59 and slot 60 in lever 55 to said lever and is provided with a roller 61 adapted to be operated by a cam 62 on the inner face of drive-pulley 31. Roller 61 is mounted in a bracket 63 which is connected to the rod 58 by a screw-thread 64 so that it can be adjusted to vary the spacing between the movable and fixed members of the presser-devices at the end of the presser stroke and to correspondingly vary the thickness of the finished "kisses." A spring 65 is applied to rod 64 to retract the movable presser members. Table 8 is provided with slots 66 for each row of presser-devices through which the shaped "kisses" or pieces of candy will be discharged onto a chute or guide plate 68 for delivery to a receptacle 69. The pieces of candy are temporarily held in presser devices in position above these holes at least until gripped between the fixed and movable side members thereof by bars 67 mounted on a rocking plate 69 which is secured to a rock-shaft 70 which is journaled in the table 8. Light cushion springs 79 are interposed between the bars 67 and plate 69 so that the pieces of candy will not be marred when dropped from the chutes 43, 44. Plate 69 is operated to permit the finished kisses to drop through slots 66 after they have been formed by cams 72 which are fixed to shaft 30 and operate a roller 73 on links 74 which are guided in lugs 75 on the frame and are pivoted, as at 76, to arms 77 which are fixed to rock shaft 70.

The operation of the machine will be as follows: Assuming shaft 30 to be driven continuously, the rotating cutters 11 will be continuously driven through gears 32, 33 and 34. When the pusher 25 is retracted, the operator will place a stick of candy x on plate 10 whereupon the pusher operated by the cam 37, link 39, shaft 41 and arms 20 will feed the stick into the bite of the co-acting stationary and rotary cutters 12 and 11. These will cause the stick to roll downwardly and be gradually grooved so that when the stick reaches the lower end of the stationary cutters 12 it will be severed into pieces which will drop through chutes 43, 44 into the presser devices, whereon they will be held by cushioned bottom bars 67 respectively. Next, cam 62 will operate rod 58 to rock lever 55 which will operate rod 50 and all of the movable presser-members 47 to press and flatten the pieces of candy in all of the presser devices into the form shown in Fig. 4ᶜ. When these side members have been retracted, the finished kisses will fall through openings 66 into chute 68, the bottom bars 67 having been withdrawn from slots 66 by the operation of plate 69 by cam 72.

The machine set forth exemplifies one for making candy kisses in which a long stick of candy is delivered to power-operated cutter mechanism which will roll the stick and sever it into pieces and by which the severed pieces will be delivered to individual presser devices operating in connection with the cutting mechanism. As the result of employing co-acting power operated cutting and pressing mechanism, the machine has a very large capacity and materially lessens the cost of production. So far as I am aware, these kisses have heretofore been manufactured by hand operated cutting and rolling mechanism which required the severed pieces to be placed individually in the pressing devices.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described, the combination of a gang of devices for cutting a long stick of candy into pieces, a table adapted to receive the sticks, mechanism for intermittently delivering a stick from the table into the cutting devices, presser-devices to which the pieces are individually conducted, mechanism for rotating the cutter devices and mechanism for operating the feed-mechanism and the presser devices in relatively timed relation.

2. The combination of a gang of cutting devices for severing a stick of candy into pieces, presser devices for the pieces disposed in laterally offset rows and means for delivering pieces individually from the cutting devices to the rows of presser devices.

3. The combination of a gang of cutting devices for severing a stick of candy into pieces, presser devices for the pieces disposed in lateral offset rows and comprising fixed and movable side-members, and means for separately delivering pieces from the cutting devices to the rows of presser devices.

4. The combination of a gang of cutting devices for severing a stick of candy into pieces, presser devices for the pieces disposed in lateral offset rows and comprising fixed and movable side members and movable bottom members, and means for delivering pieces from the cutting devices to the rows of presser devices.

5. In a machine of the character described, the combination of cutting devices for rolling and severing a stick of candy, two rows of presser devices, means to distribute pieces from the stick into said rows, said devices comprising fixed side members and common movable side members for both of the rows, and mechanism for conjointly operating all of the movable side members, 6. In a machine of the character described, the combination of cutting devices for rolling and severing a stick of candy, two rows of presser devices, means to distribute pieces from the stick into said rows, said devices comprising fixed side members, movable side members, and movable bottom members, mechanism for conjointly operating the side-members and mechanism for conjointly operating the bottom members.

7. In a machine of the character described, the combination of cutting devices for rolling and severing a stick of candy, presser devices, means to distribute pieces from the stick into said rows, said devices comprising fixed side members, movable side members and cushioned movable bottom members.

8. In a machine of the character described, the combination of a gang of cutting devices for rolling and severing a stick of candy, a table under said cutting devices, presser devices on the table to which the pieces are individually delivered, each of said presser devices comprising a stationary side member fixed to the table, a movable side member, and a movable bottom member, the table being formed with an opening for the bottom members, and through which the pieces will fall by gravity when released from the presser devices.

FRED E. ZAISS.

Copies of this patent may be obtained for five cents each, by addressing the "Commissioner of Patents, Washington, D. C."